United States Patent
Gupta et al.

(10) Patent No.: US 9,496,813 B2
(45) Date of Patent: Nov. 15, 2016

(54) METHOD OF OPERATING A WIND TURBINE AS WELL AS A SYSTEM SUITABLE THEREOF

(71) Applicant: VESTAS WIND SYSTEMS A/S, Aarhus N (DK)

(72) Inventors: Amit Kumar Gupta, Singapore (SG); Ryan Arya Pratama, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/407,592

(22) PCT Filed: Jul. 12, 2013

(86) PCT No.: PCT/DK2013/050237
§ 371 (c)(1),
(2) Date: Dec. 12, 2014

(87) PCT Pub. No.: WO2014/012553
PCT Pub. Date: Jan. 23, 2014

(65) Prior Publication Data
US 2015/0155809 A1   Jun. 4, 2015

(30) Foreign Application Priority Data

Jul. 19, 2012   (DK) ................................ 2012 70440

(51) Int. Cl.
*F03D 9/00* (2016.01)
*H02P 9/10* (2006.01)
(Continued)

(52) U.S. Cl.
CPC ............. *H02P 9/102* (2013.01); *F03D 7/0224* (2013.01); *F03D 7/0284* (2013.01); *F03D 9/003* (2013.01);
(Continued)

(58) Field of Classification Search
CPC ............ F03B 2270/337; H02P 2101/15; H02P 2101/102; F03D 7/0224; F03D 7/0284; F03D 7/003
(Continued)

(56) References Cited

U.S. PATENT DOCUMENTS

| 7,256,508 B2 * | 8/2007 | Altemark | ................ F03D 9/003 290/44 |
| 8,093,740 B2 * | 1/2012 | Oohara | .................. F03D 7/0224 290/44 |
| 8,957,536 B2 * | 2/2015 | Gupta | .................... F03D 7/0284 290/44 |

(Continued)

FOREIGN PATENT DOCUMENTS

| CN | WO 2013060024 A1 * | 5/2013 | ............... H02H 7/06 |
| EP | 1819023 A2 | 8/2007 | |

(Continued)

OTHER PUBLICATIONS

International Search Report for PCT/DK2013/050237, Oct. 18, 2013.
Danish Search Report for PA 2012 7440, Mar. 4, 2013.

*Primary Examiner* — Julio Gonzalez Ramirez
(74) *Attorney, Agent, or Firm* — Patterson + Sheridan, LLP

(57) ABSTRACT

A method of operating a wind turbine is provided. The wind turbine comprises a turbine rotor with at least one blade having a variable pitch angle, a power generator, and a power converter connected to the power generator via a first circuit breaker and to a power grid via a second circuit breaker. According to the method, overvoltage events at the power grid are monitored. If an overvoltage event is detected, the method comprises opening the first circuit breaker and the second circuit breaker, disabling active operation of the power converter, connecting a power dissipating unit to the power generator to dissipate power (Continued)

output from the power generator, and moving the pitch angle of the at least one blade towards a feathered position.

20 Claims, 6 Drawing Sheets

(51) Int. Cl.
*F03D 7/02* (2006.01)
*H02P 101/15* (2015.01)

(52) U.S. Cl.
CPC .... *F05B 2270/107* (2013.01); *F05B 2270/337* (2013.01); *H02P 2101/15* (2015.01); *Y02E 10/723* (2013.01)

(58) Field of Classification Search
USPC ......... 290/44, 55; 415/1; 700/286, 287, 297; 416/1
See application file for complete search history.

(56) References Cited

U.S. PATENT DOCUMENTS

| | | | | |
|---|---|---|---|---|
| 8,994,202 | B2* | 3/2015 | Gupta | F03D 9/003 290/44 |
| 2006/0163882 | A1 | 7/2006 | Brandt | |
| 2007/0100506 | A1* | 5/2007 | Teichmann | H02J 3/24 700/297 |
| 2008/0277938 | A1* | 11/2008 | Oohara | F03D 7/0224 290/44 |
| 2010/0091417 | A1* | 4/2010 | Letas | F03D 9/003 361/21 |
| 2010/0140939 | A1 | 6/2010 | Scholte-Wassink et al. | |
| 2011/0140423 | A1* | 6/2011 | Menke | F03D 7/0224 290/44 |
| 2011/0163546 | A1* | 7/2011 | Gupta | F03D 7/0272 290/44 |
| 2015/0188468 | A1* | 7/2015 | Xu | H02P 9/007 290/44 |
| 2015/0214726 | A1* | 7/2015 | Hsiao | H02J 1/00 290/44 |
| 2015/0333677 | A1* | 11/2015 | Letas | H02P 9/02 290/44 |

FOREIGN PATENT DOCUMENTS

| | | | | |
|---|---|---|---|---|
| SG | WO 2012000508 A2 * | 1/2012 | ........... | F03D 7/0284 |
| SG | WO 2012076015 A2 * | 6/2012 | ............ | F03D 9/003 |
| WO | 2012/076015 A2 | 6/2012 | | |

* cited by examiner

METHOD OF OPERATING A WIND TURBINE AS WELL AS A SYSTEM SUITABLE THEREOF

BACKGROUND

The present invention relates to a method of operating a wind turbine. Further, the present invention relates to a controller system for controlling operation of a wind turbine. Finally, the present invention relates to a wind turbine.

Overvoltages (OV) are gaining attention from wind farm owners and wind turbine manufacturers due to the large amount of sensitive power electronics in wind turbines with frequency converters. The transmission system operators are also interested in this phenomenon, since situations in the grid connection system of offshore wind farms have occurred where the insulation systems have been stressed in situations never experienced before. Overvoltages as high as 2 p.u. (per unit) have been observed.

According to the grid code studies, a voltage up to 2 times the nominal grid voltage can be applied at the WTG terminals. For example, in Australia, the temporary OV can be up to 1.6 pu and in Canada-Manitoba the temporary OV can be up to 2.0 pu.

In W. Sweet, "Danish Wind Turbines Take Unfortunate Turn", IEEE Spectrum, vol. 41, no. 11, pp. 30, 2004, it was reported that on the west coast of Denmark an offshore wind farm called Horns Rev 1 connected by an undersea cable experienced overvoltages as high as 2 p.u. when the main-circuit breaker tripped at the on-land connection point, leaving the wind farm in isolated operation with the cable and the wind farm transformer.

Although such events are rare, this represents a risk of damaging the equipment in the wind turbine. The Danish transmission system operator thus performed investigations of such OV in connection with the planning of new offshore wind farms. These investigations have shown that the OV levels are influenced by many parameters, including operational characteristics of the wind turbines prior to the disconnection, protection systems, control and the accuracy of the representation of the cable and the transformers in the relevant frequency range.

It is desirable to provide a method to handle overvoltage for wind turbines which are highly effective and easy to implement.

SUMMARY OF THE INVENTION

According to a first aspect of the invention, a method of operating a wind turbine is provided. The wind turbine comprises a turbine rotor with at least one blade having a variable pitch angle, a power generator, and a power converter connected to the power generator via a first circuit breaker and to a power grid via a second circuit breaker. According to the method, overvoltage events at the power grid are monitored. If an overvoltage event is detected, the method comprises opening the first circuit breaker and the second circuit breaker, disabling active operation of the power converter, connecting a power dissipating unit to the power generator to dissipate power output from the power generator, and moving the pitch angle of the at least one blade towards a feathered position.

The first and second circuit breakers connect the power converter to the power generator and to the power grid, respectively, when closed. When the switches are opened, the power converter is disconnected from the power generator and from the power grid.

Disabling active operation of the power converter means (or at least includes) that PWM (pulse width modulation) signals to the power converter are inhibited. Vice versa, enabling active operation of the power converter may include that the PWM signals to the converter are no longer inhibited.

The power dissipating unit is connected to the output of the power generator to dissipate power therefrom. The power dissipating unit may comprise a resistor or a resistor bank having a plurality of resistors. The power dissipating unit may also further comprise a switch connected between the generator output and the resistor bank or at any other situation locations. During normal conditions, the switch is "open", and the resistor bank is not connected to the power generator. When an overvoltage event is detected, the switch is "closed" and the resistor bank is thereby connected to the output of the power generator to dissipate power therefrom.

The feathered position of the blade is the pitch angle at which the blade does not experience any lift generated by the wind. When all the blades of the turbine are at the feathered position, the turbine rotor stops rotating and therefore power generation is stopped. The pitch angle of the blade at the feathered position is usually at about 90 degrees, but it is possible that the feathered position is at other angles.

The first aspect of the invention allows the turbine to handle severe grid overvoltage events (e.g. up to 2 pu or more) without damage to the power components in the turbine, and also enables fast reconnection of the turbine to the power grid as soon as the overvoltage event is over. Accordingly, the turbine can start power production again in a very short time.

Another advantage of this aspect is that major power components in the power converter system remain unchanged in order to ensure short term overvoltage ride through for the turbine. Furthermore, only minor software changes (regarding controlling software which controls the operation of the wind turbine) need to be done. Minor hardware changes such as sensors, simple power electronics switches, chokes and wirings might be required. The method is very robust, and can handle both symmetric and asymmetric overvoltages.

Typically, a grid voltage above 1.1 pu is considered an overvoltage or voltage swell. However, nominal voltage range and overvoltage level changes from country to country. Small amount of overvoltage may be handled by absorbing reactive power by active switching processes of the power converter. But such absorbing of reactive power through the power converter may not be adequate for handling larger overvoltage.

The term "overvoltage event" means the occurrence of an overvoltage. The overvoltage event may include small overvoltage of about 1.1-1.3 pu or large overvoltage of more than 1.3 pu. Even though it is mentioned that small overvoltage of 1.1 pu can be handled by the power converter by absorbing reactive power, it is also possible that small overvoltage is handled according to the present invention. The overvoltage event may also include the occurrence of a concatenation of several successive overvoltage events.

According to an embodiment, the method further comprises determining whether the pitch angle of the at least one blade has reached a predefined position. If the pitch angle of the at least one blade has reached the predefined position, the method further comprises closing the first circuit breaker and the second circuit breaker, disconnecting the power dissipating unit from the power generator, and enabling active operation of the power converter.

The predefined position for the blade angle may be at the feathered position in one embodiment. The predefined position may also be at other blade angle positions where the resultant rotation of the turbine rotor, and hence power production, is sufficiently low. When the pitch angle of the blade has reached the predefined position, the turbine is re-connected to the power grid by closing the circuit breakers, and power production is resumed by enabling active operation of the power converter.

By re-connecting the turbine to the power grid only when the pitch angle of the blade has reached the predefined position, it is ensured that the turbine only begin power production at low power. This avoids large torque acting on the generator when generator load is switched from the power dissipating unit to the power grid, and hence large loads or oscillations on the drive train in the turbine is prevented.

According to an embodiment, the method further comprises ramping up the power output of the power generator. According to a further embodiment, the ramping up the power output of the power generator comprises moving the pitch angle of the at least one blade away from the feathered position.

After the turbine is re-connected to the power grid, the power generator is only generating low power due to the stationary or slow rotating turbine rotor. The power production is increased by pitching the at least one blade away from the feathered position, that is, into the wind. Accordingly, the oncoming wind causes the blade(s), and hence the turbine rotor, to rotate. As the rotation speed of the turbine rotor increases, power production is increased or ramped up.

According to an embodiment, the method further comprises determining whether it is possible to re-connect the turbine to the power grid after the pitch angle of the at least one blade has reached the predefined position. If it is not possible to re-connect to the power grid, the method comprises determining whether a timeout period has been exceeded, repeating the step of determining whether it is possible to re-connect the turbine to the power grid if the timeout period has not been exceeded, and shutting down the turbine if the timeout period has been exceeded.

In this embodiment, if the turbine is unable to re-connect to the power grid within this period, the turbine is shutdown. This is because when the turbine is in an operating state (i.e. not shut down) but cannot deliver any power to the power grid, some components in the turbine may be in a highly stressed state. For example, the power dissipating unit connected to the power generator output may only be able to dissipate the generator power for a certain period of time. Beyond that, the dissipating unit may be damaged. Accordingly, the turbine is shut down if it cannot be re-connected to the power grid after the timeout period.

According to an embodiment, the duration of the timeout period is predefined based on at least one component rating of the wind turbine or the grid code. For example, the timeout period may be predefined based on a voltage rating of a component. This component may be a component which is most likely to breakdown.

According to an embodiment, determining whether it is possible to re-connect the turbine to the power grid comprises determining whether the overvoltage event is over. This ensures that the turbine is only re-connected to the power grid when the overvoltage event is over. Normally the overvoltage event is over before the pitch angle of the blades has reached the predefined position. However there may be cases where the overvoltage event lasts for a long time or where there is a new overvoltage event. Hence in this embodiment, it is ensured that the turbine is not re-connected to the power grid when there is still an overvoltage event in the power grid.

According to an embodiment, the opening of the first circuit breaker and/or the second circuit breaker comprises creating a short-circuit condition at the circuit breakers. A circuit breaker usually includes an overcurrent protection. When the circuit breaker detects a large current flow, the circuit breaker is opened to prevent the current inrush. According to the embodiment, a short-circuit condition is created at one or both the circuit breakers to generate a large current inrush, thereby triggering the opening of the circuit breakers. This method causes the circuit breakers to be opened within a very short time.

According to a second aspect of the invention, a controller system for operating a wind turbine is provided. The wind turbine comprises a turbine rotor with at least one blade having a variable pitch angle, a power generator, and a power converter connected to the power generator via a first circuit breaker and to a power grid via a second circuit breaker. The controller system is adapted to monitor the power grid for overvoltage events. If an overvoltage event is detected, the controller system is adapted to open the first circuit breaker and the second circuit breaker, disable active operation of the power converter, connect a power dissipating unit to the power generator to dissipate power output from the power generator, and move the pitch angle of the at least one blade towards a feathered position.

According to an embodiment, the controller system is further adapted to determine whether the pitch angle of the at least one blade has reached a predefined position. And if the pitch angle of the at least one blade has reached the predefined position, the controller system is adapted to close the first circuit breaker and the second circuit breaker, disconnect the power dissipating unit from the power generator, and enable active operation of the power converter.

According to an embodiment, the controller system is further adapted to ramp up the power output of the power generator.

According to an embodiment, the controller system is further adapted to ramp up the power output of the power generator by moving the pitch angle of the at least one blade away from the feathered position.

According to an embodiment, the controller system is further adapted to determine whether it is possible to re-connect the turbine to the power grid after the pitch angle of the at least one blade has reached the predefined position. And if it is not possible to re-connect to the power grid, the controller system is adapted to determine whether a timeout period has been exceeded, and repeat the step of determining whether it is possible to re-connect the turbine to the power grid if the timeout period has not been exceeded, and shut down the turbine if the timeout period has been exceeded.

According to an embodiment, the controller system is further adapted to determine whether it is possible to re-connect the turbine to the power grid by determining whether the overvoltage event is over.

According to an embodiment, the controller system is further adapted to open at least one of the first circuit breaker and the second circuit breaker by inducing a short circuit condition at one or both the circuit breakers.

According to a third aspect of the invention, a wind turbine comprising a controller system described in any one of the above embodiments is provided.

BRIEF DESCRIPTION OF THE DRAWINGS

The invention will be better understood with reference to the detailed description when considered in conjunction with the non-limiting examples and the accompanying drawings.

DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
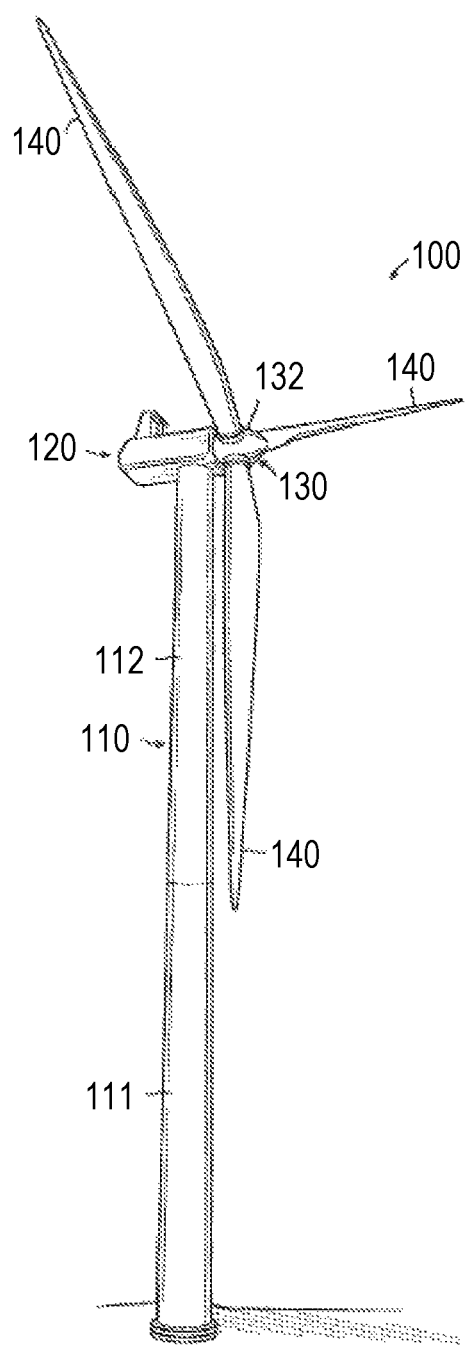
FIG. 1 shows a general structure of a wind turbine.

FIG. 1 illustrates an exemplary wind turbine 100 according to an embodiment. As illustrated in FIG. 1, the wind turbine 100 includes a tower 110, a nacelle 120, and a rotor 130. In one embodiment, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 140 further comprises mechanisms (not shown) for adjusting the pitch of the blade 140 to increase or reduce the amount of wind energy captured by the blade 140. Pitching adjusts the angle at which the wind strikes the blade 140. It is also possible that the pitch of the blades 140 cannot be adjusted. In this case, the aerodynamic profile of the blades 140 is designed in a manner that the lift experienced by the blades are lost when the wind speed exceeded a certain threshold, causing the turbine to stall.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the wind turbine 100 shown in FIG. 1 has three blades 140, it should be noted that a wind turbine may have different number of blades. It is common to find wind turbines having two to four blades. The wind turbine 100 shown in FIG. 1 is a Horizontal Axis Wind Turbine (HAWT) as the rotor 130 rotates about a horizontal axis. It should be noted that the rotor 130 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 140 in the rotor 130.

Figure 2:
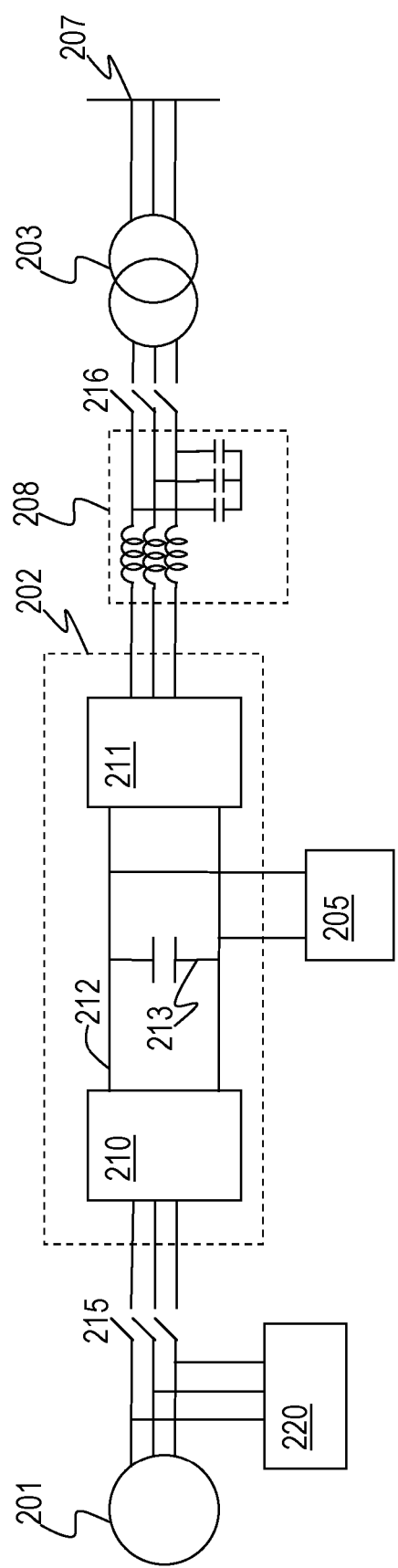
FIG. 2 shows an electrical system of the wind turbine.

FIG. 2 shows an electrical system of the wind turbine according to an embodiment. The electrical system includes a generator 201, a power converter 202 and a main transformer 203. The electrical system is connected to a power grid 207. The power converter 202 includes a generator-side converter 210 and a grid-side converter 211 connected via a direct current (DC) link 212. The DC-link 212 includes a DC-link capacitor 213. The electrical system includes a first energy dissipating circuit 220 connected to the output of the generator 201 and a second energy dissipating circuit 205 connected to the DC-link 212. The first dissipating unit 220 is known as the generator load dump and the second dissipating unit 205 is known as the DC load dump or chopper circuit.

The electrical system also includes grid-side filters 208 for filtering switching harmonics. The electrical system includes a generator-side breaker 215 between the generator 201 and the generator-side converter 210, and a grid-side breaker 216 between the grid harmonic filter 208 and the transformer 203. The grid-side breaker 216 may be placed at other locations, for example between the grid-side converter 211 and the grid harmonic filter 208.

The generator 201 converts mechanical energy or power to electrical energy or power having AC voltage and current (collectively referred to as "AC signals"), and provides the generated AC signals to the generator-side converter 210. The AC signals from the generator 201 have a variable frequency, due to varying wind. The generator-side converter 210 converts or rectifies the AC signals to DC voltage and current (collectively know as "DC signals"). The grid-side converter 211 converts the DC signals from the DC-link 212 into fixed frequency AC signals for the power grid 207. The voltage of the fixed frequency AC signals at the output of the grid-side converter 211 is stepped up by the main transformer 203 into a level suitable to be received and transmitted by the power grid 207.

The generator load dump 220 is adapted to dissipate energy from the generator 201. The generator load dump includes at least one switch and a plurality of dissipating units such as resistors (not shown). The operation of the generator load dump 220 is controlled by activating the at least one switch. When the switch is closed, energy from the generator 201 is dissipated by the generator load dump 220. Similarly, the DC load dump 205 is adapted to dissipate energy stored at the DC-link 212. The energy dissipating circuit 205 also includes at least one switch to and a plurality of dissipating units such as chopper resistors (not shown). The operation of the energy dissipating circuit 205 is controlled by activating the at least one switch. When the switch is closed, energy stored at the DC-link 212 is dissipated by the chopper resistors.

The generator-side converter 210 and the grid-side converter 211 comprises a plurality of power semiconductor switches such as IGBTs (Insulated Gate Bipolar Transistors) and their operations are controlled by pulsewidth modulated signals (also known as PWM signals) at a specific switching frequency. By controlling the PWM signals, the operation of the power converter and hence the AC signals at the output of the grid-side converter 211 can be controlled.

The operation of the generator load dump 220, the DC load dump 205 and the power converter 202 are controlled by one or more controllers (not shown), specifically for controlling the switches of the load dumps 205, 220, and generating the switching signals for controlling the power converter 202. In one embodiment, one single controller is used to control the operation of the generator load dump 220, the DC load dump 205 and the power converter 202. In another embodiment, one controller is used to control the operation of the generator load dump 220, and another separate controller is used to control the operation of the DC load dump 205 and the power converter 202. The one or more controllers also control the operation of the circuit breakers 215, 216.

It should be noted that FIG. 2 is only an illustration of an electrical system in a wind turbine where only common components are shown. The electrical system may include other components such as generator-side filters, sensors, pre-charge arrangement, etc. In another embodiment, a doubly-fed induction generator (DFIG) may be used wherein the stator windings of the generator are connected to the grid via the turbine transformer, and the rotor windings of the generator is connected to the turbine transformer via a power converter system. The energy dissipating units 205, 220 may only have one resistor instead of a plurality of resistors. The energy dissipating units 205, 220 may also include other dissipating units suitable for dissipating power.

When an overvoltage event occurs at the grid 207, the grid-side converter 211 acts as a diode bridge rectifier and charges the DC link 212. As a result, the DC link voltage rises. This high DC link voltage may damage the IGBTs in the converters 210, 211. If the DC link voltage rises beyond a certain threshold, the turbine may trip. Therefore it is desirable that overvoltage event are detected and its effects mitigated as early as possible.

Figure 3:
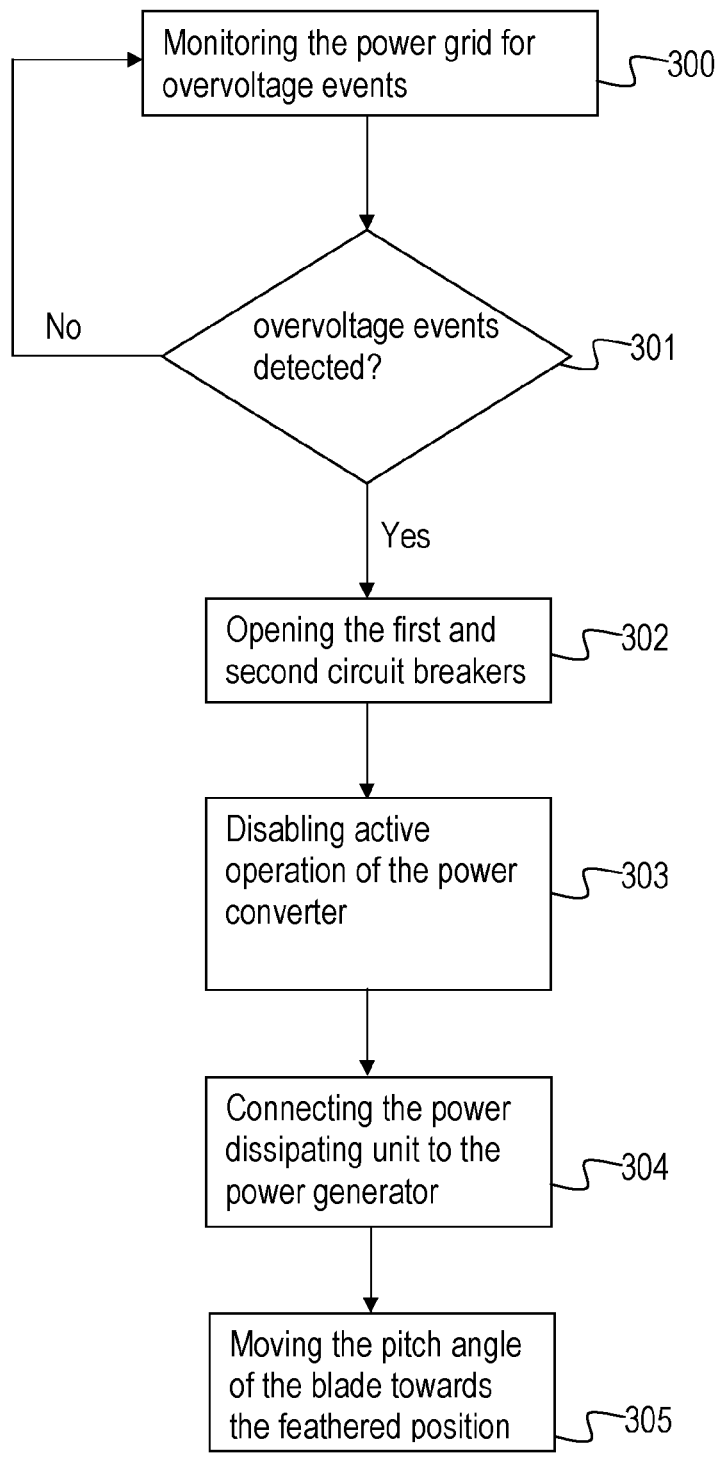
FIG. 3 shows a flow-chart of a method for operating the wind turbine according to an embodiment.

FIG. 3 shows a chart-flow of a method for handling an overvoltage according to an embodiment. Step 300 includes monitoring the power grid for overvoltage events. Overvoltage events include situations when the grid voltage is higher than the nominal grid voltage, for example when the grid voltage is between 1.1 pu to 2.0 pu. The grid voltage may be monitored directly using voltage sensors coupled to the low-voltage or high-voltage side of the turbine transformer 203. The grid voltage may also be determined at the output terminals of the grid-side converter 211.

Step 301 includes determining whether an overvoltage event has been detected. This step includes determining whether the grid voltage is in the range of 1.1 pu to 2.0 pu with respect to the nominal grid voltage in one embodiment. Other grid voltage ranges for determining whether an overvoltage event has been detected are possible in other embodiments. If no overvoltage event has been detected, the turbine continues to monitor the grid for overvoltage events. If overvoltage event has been detected, the generator-side circuit breaker 215 and the grid-side circuit breaker 216 are opened in step 302. The opening of the generator-side and grid-side circuit breakers 215, 216 disconnects the power converter 202 of the turbine from the generator 201 and the grid 207, respectively.

Step 303 includes disabling active operation of the power converter. The power converter, for example the generator-side and grid-side converters, includes a plurality of semiconductor switches such as Insulated Gate Bipolar Transistors (IGBTs). The operation (i.e. switching) of these IGBTs are controlled by a PWM (pulse width modulation) signal. In one embodiment, disabling active operation of the power converter includes suspending or inhibiting the PWM signal to the power converter.

Step 304 includes connecting the power dissipating unit to the power generator to dissipate power therefrom. In an embodiment, power from the generator 201 is dissipated in the generator load dump 220. This is to ensure that a load is still applied to the generator since the power converter has been disconnected.

Step 305 includes moving the pitch angle of the blade towards the feathered position. In other words, the pitch angle of the blades are pitched out such that the energy captured from the wind is reduced to a zero or close to zero or to a limit that is safe from a mechanical drive train point of view. Accordingly, the power output from the generator is also substantially zero. The purpose of pitching out the blades is so that when the turbine reconnects to the grid by closing the circuit breakers, it can begin with low power production. This avoids large torque acting on the generator when the load is switched from the generator load dump to the grid.

It should be noted that the overvoltage event usually last shorter than the time taken for the blades to move to the feathered position. Then it is assumed that when the overvoltage event is over, the blades are still in the process of moving towards the feathered position.

Figure 4:
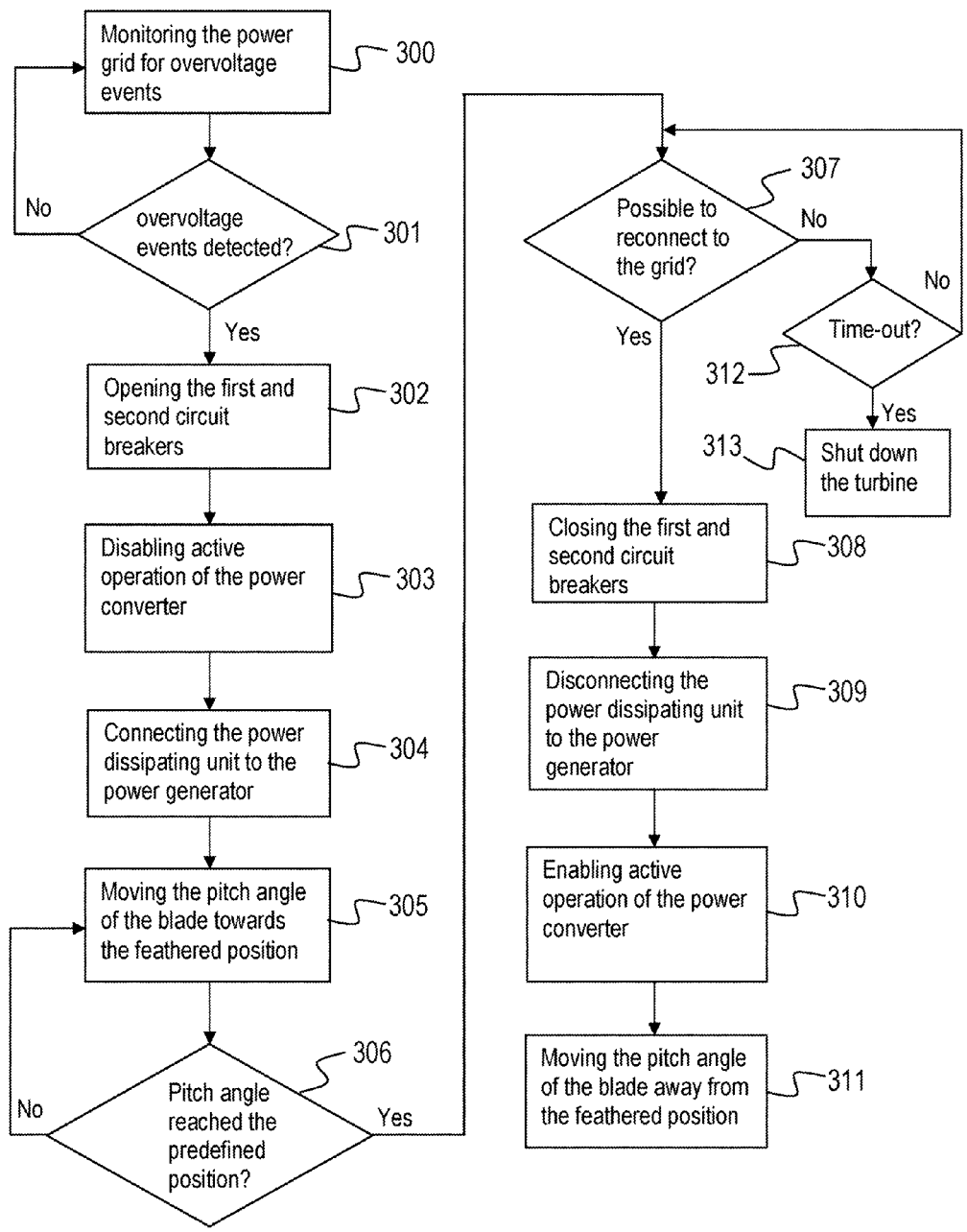
FIG. 4 shows a flow-chart of a method for operating the wind turbine according to another embodiment.

FIG. 4 shows a flow-chart of a method for handling an overvoltage event according to a further embodiment. Steps 300 to 305 are identical to the steps in FIG. 3, and shall not be described again. After the pitch angle of the blades are moved towards the feathered position at step 305, it is checked at step 306 whether the pitch angle has reached the predefined position. In one embodiment, the predefined position is the feathered position where the blades are fully pitched out. In another embodiment, the predefined position is a pitch angle which is close to the feathered position. When the pitch angle of the blades have not reached the predefined position, the blades continue to move towards the feathered position until it has reached the predefined position.

When the pitch angle of the blades have reached the predefined position, it is then determined whether it is possible to reconnect to the grid at step 307. Determining whether it is possible to reconnect to the grid includes determining whether the overvoltage event is over. As mentioned earlier, overvoltage event usually last shorter than the time taken for the pitch angle of the blades to reach the feathered (or the predefined) position. Therefore at this stage, the overvoltage event would normally be over and it is normally possible to reconnect to the grid. It is also advantageous to take into account grid code compliance and power component health and ratings into account when determining whether it is possible to reconnect to the grid.

When it is not possible to reconnect to the grid, it is determined whether a timeout period has expired at step 312. If it is not possible to reconnect to the grid after the timeout period, the turbine is shutdown at step 313. The timeout period is dependent on a component rating of at least one component of the turbine. The timeout period may also be dependent on grid compliance. As mentioned earlier, some components may be at a highly stressed state when the turbine is in an operating state (i.e. not shut down) but cannot deliver any power to the power grid. For example, the power dissipating unit connected to the power generator output may only be able to dissipate the generator power for a certain period of time. Beyond that, the dissipating unit may be damaged. Accordingly, the timeout period is predefined based on the rating of the dissipating unit, such that the turbine is shutdown if it is not possible to reconnect to the grid beyond the timeout period. The health of the turbine components may also be taken into consideration.

Step 308 includes closing the generator-side and the grid-side circuit breakers when it is determined at step 307 that it is possible to reconnect to the grid. Closing the circuit breakers reconnects the turbine to the power grid. Step 309 includes disconnecting the power dissipating unit from the generator. When the turbine is reconnected back to the grid, power from the generator can be supplied to the grid. Therefore, the power dissipating unit is disconnected from the power generator. In other words, the generator load is switched from the power dissipating unit to the grid.

Step 310 includes enabling active operation of the power converter. In one embodiment, the PWM signal to the power converter is resumed. At this stage, the turbine is ready to process the power output from the generator for the grid, and power production can be increased. Step 311 includes moving the pitch angle of the blades away from the feathered position. In other words, the blades are pitched in to cause the rotor of the turbine to start spinning in order to start the power production. As the blades continue to pitch into the wind (i.e. away from the feathered position), the power output generated from the generator increases.

According to the embodiment, the blades are pitched out (at or near the feathered position) before reconnection to the grid takes place. This ensures that the turbine begins with low power production at reconnection to the grid. This avoids large torque acting on the generator when the load for the generator is switched from the power dissipating unit to the grid. Thereafter, power production is ramped up again by pitching the blades back into the wind.

Figure 5:
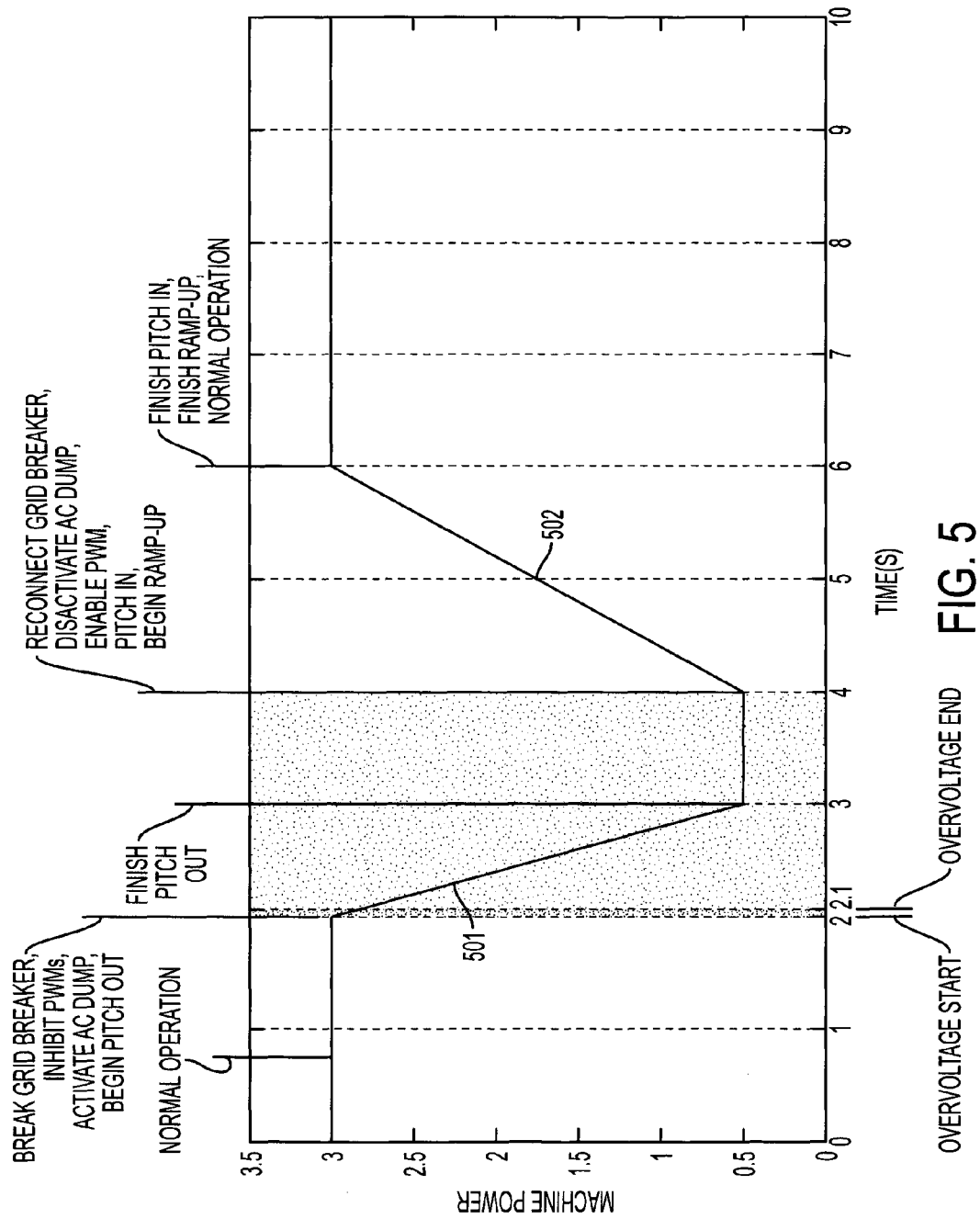
FIG. 5 shows a time chart illustrating the sequence of events during an overvoltage event according an embodiment.

FIG. 5 shows an example of a timing diagram of power output from the generator during an overvoltage event according to an embodiment. Before the overvoltage event, the turbine is operating normally under normal conditions and power output is generally constant. Overvoltage event takes place at t=2 s. At this instant, the circuit breakers are opened, the active operation of the converters are disabled, the power dissipating unit is connected to the generator, and the pitch angle of the blades are moved towards the feathered position. As blades are pitched towards the feathered position, energy captured from the wind decreases. Accordingly, the power output also decreases as can be seen from the slope 501. The overvoltage event usually last only for a short period of time compared to the time taken for the blades to pitch to the feathered position. In this example, the overvoltage event is over at t=2.1 s. However, the blades are still pitching out until it has reached the predefined position.

The pitching of the blades is complete at about t=3 s, and it is checked whether it is possible to reconnect to the grid. At about t=4 s, the turbine is reconnected to the grid. Specifically, the circuit breakers are closed, the power dissipating unit is disconnected from the generator, the active operation of the converters are enabled, and the blades are moved away from the feathered position. As the blades are pitched in (i.e. away from the feathered position), more energy is captured from the wind. Accordingly, the power output also increases as can be seen from the slope 502. At about t=6 s, the power production ramp up is complete and power output is at its rated power. It should be noted that the timings illustrated in FIG. 5 is purely exemplary, and might differ in other examples.

As can be seen from the description above, it is advantageous to quickly open the circuit breakers when an overvoltage event is detected to prevent the components in the turbine from being damaged by the sharp voltage rise due to the overvoltage. In one embodiment, the circuit breakers are opened by introducing an overcurrent event. When there is a short circuit condition at the circuit breaker, for example at the output of the grid-side converter, large current will flow through the circuit breaker in a short time. This large current causes the circuit breaker to open its breaker very quickly. In this embodiment, such a short circuit condition is induced in the path of the circuit breaker.

In one embodiment, the short circuit condition is induced by turning on all the bottom IGBTs of the grid-side converter, and turning off all the top IGBTs. Accordingly, a short circuit condition with the bottom ground rail is induced without using any new hardware or controls. However due to the large current flowing through the IGBTs, the duration of the short circuit condition should be controlled to prevent damage to the IGBTs. Factors affecting the duration of the short circuit condition include how long the IGBTs can withstand the short circuit current, how long it takes for the breaker to open given the expected short circuit current, etc. The time-out period (see step 312 in FIG. 4) may be determined at least based on the duration of the short circuit condition.

Figure 6:
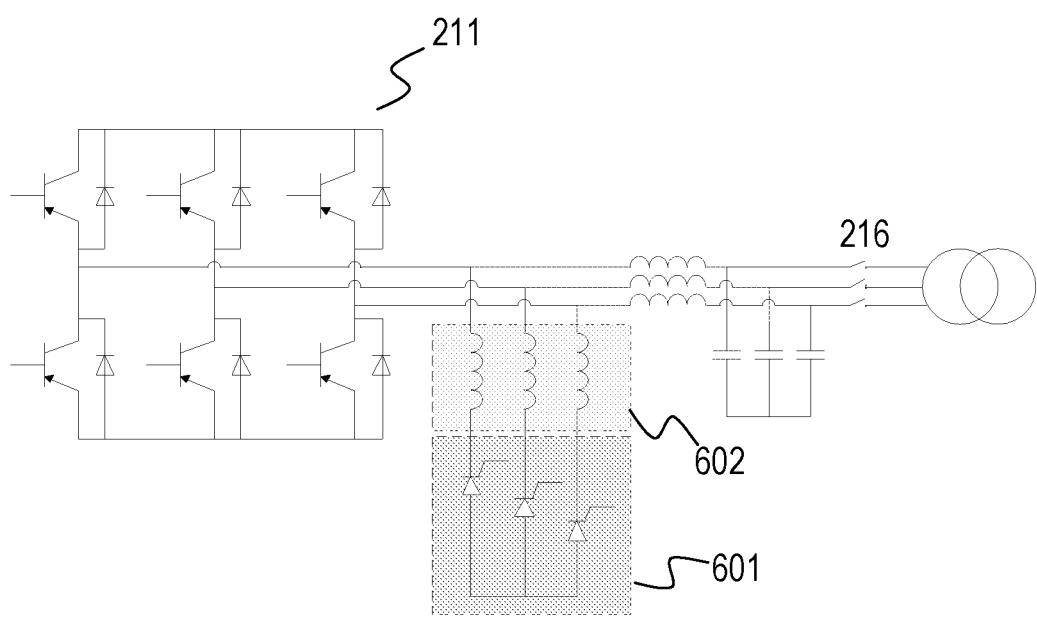
FIG. 6 shows an exemplary hardware implementation for creating a short-circuit condition at a circuit breaker according to an embodiment.

In another embodiment, the short circuit condition is induced by connecting a thyristor circuit to the circuit breaker as shown in FIG. 6. The thyristor circuit 601 is connected to the line output between the grid-side converter 211 and the grid-side circuit breaker 216. When an overvoltage event is detected, the thyristors are fired, thereby creating a short circuit condition at the circuit breaker 216. It should be noted that in this embodiment, new hardware (thyristor) and control system (for controlling the thyristor circuit) is needed. Similarly, the duration of the short circuit condition should be controlled to prevent damage to the thyristors. Alternatively, the thyristors may be selected such that they can withstand a certain during of short circuit condition. The time-out period (see step 312 in FIG. 4) may be determined at least based on the duration of the short circuit condition. It should be noted that in other embodiments, the thyristor circuit may be replaced with other power semiconductor circuits achieving the same functionality.

In a further embodiment, the one or more inductor circuit 602 is connected in series with the thyristor circuit as shown in FIG. 6. The inductor circuit 602 limits the short circuit current flowing to the thyristor circuit 601 and the grid-side converter 211, and hence keeping it at a safe level. The impedance value of the inductor circuit 602 is chosen to maintain a balance between the fast opening of the circuit breaker 216 and keeping the short circuit current at a safe level. Other current limiting components may be used in place of the inductor circuit 602 to limit the short circuit current in other embodiments.

Some commercially available circuit breakers may support add-ons that enable them to open based on sensor readings such as overvoltage or undervoltage. In one embodiment, the circuit breaker is opened based on sensor readings indicating an overvoltage event. Specifically, when an overvoltage is detected by a voltage sensor, a command is sent to the circuit breaker to open the circuit. This command may be sent from a controller, such as the converter controller. The advantage of this embodiment of opening the circuit breaker using voltage sensor is that no large current is induced at the output of the grid-side converter.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a wind turbine comprising a turbine rotor with at least one blade having a variable pitch angle, a power generator coupled to an input of a power converter via a first circuit breaker and an output of the power converter coupled to a power grid via a second circuit breaker, the method comprising:
   monitoring the power grid for overvoltage events;
   upon detecting an overvoltage event:
      opening the first circuit breaker and the second circuit breaker,
      disabling active operation of the power converter,
      controlling a power dissipating unit to dissipate power output from the power generator, and
      moving the pitch angle of the at least one blade towards a feathered position; and
   upon determining the pitch angle of the at least one blade has reached a predefined position:
      closing the first circuit breaker and the second circuit breaker,
      controlling the power dissipating unit to cease dissipating power output from the power generator, and
      enabling active operation of the power converter.

2. The method according to claim 1, further comprising ramping up the power output of the power generator.

3. The method according to claim 2, wherein the ramping up the power output of the power generator comprises moving the pitch angle of the at least one blade away from the feathered position.

4. The method according to claim 1, further comprising:
   determining whether it is possible to re-connect the turbine to the power grid after the pitch angle of the at least one blade has reached the predefined position; and
   if it is not possible to re-connect to the power grid:
      determining whether a timeout period has been exceeded; and
      repeating the step of determining whether it is possible to re-connect the turbine to the power grid if the timeout period has not been exceeded, and
   shutting down the turbine if the timeout period has been exceeded.

5. The method according to claim 4, wherein the duration of the timeout period is predefined based on at least one of a component rating of the wind turbine and a grid code requirement.

6. The method according to claim 4, wherein determining whether it is possible to re-connect the turbine to the power grid comprises determining whether the overvoltage event is over.

7. The method according to claim 1, wherein opening the first circuit breaker and second circuit breaker comprises creating a short circuit condition at one or more of the circuit breakers.

8. A controller system for operating a wind turbine comprising a turbine rotor with at least one blade having a variable pitch angle, a power generator coupled to an input of a power converter via a first circuit breaker and an output of the power converter coupled to a power grid via a second circuit breaker, the controller system is configured to:
   monitor the power grid for overvoltage events;
   upon detecting an overvoltage event:
      open the first circuit breaker and the second circuit breaker,
      disable active operation of the power converter,
      control a power dissipating unit to dissipate power output from the power generator, and
      move the pitch angle of the at least one blade towards a feathered position; and
   upon determining the pitch angle of the at least one blade has reached a predefined position:
      close the first circuit breaker and the second circuit breaker,
      control the power dissipating unit to cease dissipating power output from the power generator, and
      enable active operation of the power converter.

9. The controller system according to claim 8, wherein the controller system is further configured to ramp up the power output of the power generator.

10. The controller system according to claim 9, wherein the controller system is further configured to ramp up the power output of the power generator by moving the pitch angle of the at least one blade away from the feathered position.

11. The controller system according to claim 8, wherein the controller system is further adapted to:
   determine whether it is possible to re-connect the turbine to the power grid after the pitch angle of the at least one blade has reached the predefined position; and
   if it is not possible to re-connect to the power grid:
      determine whether a timeout period has been exceeded; and
      repeat the step of determining whether it is possible to re-connect the turbine to the power grid if the timeout period has not been exceeded, and shut down the turbine if the timeout period has been exceeded.

12. The controller system according to claim 11, wherein the controller system is further configured to determine whether it is possible to re-connect the turbine to the power grid by determining whether the overvoltage event is over.

13. The controller system according to claim 8, wherein the controller system is further configured to open at least one of the first circuit breaker and the second circuit breaker by inducing a short circuit condition at one or more of the circuit breakers.

14. A wind turbine comprising a turbine rotor with at least one blade having a variable pitch angle, a power generator coupled to an input of a power converter via a first circuit breaker and an output of the power converter coupled to a power grid via a second circuit breaker, and a controller, wherein the controller is configured to:
   monitor the power grid for overvoltage events;
   upon detecting an overvoltage event:
      open the first circuit breaker and the second circuit breaker,
      disable active operation of the power converter,
      control a power dissipating unit to dissipate power output from the power generator, and
      move the pitch angle of the at least one blade towards a feathered position; and
   upon determining the pitch angle of the at least one blade has reached a predefined position:
      close the first circuit breaker and the second circuit breaker,
      control the power dissipating unit to cease dissipating power output from the power generator, and
      enable active operation of the power converter.

15. The wind turbine according to claim 14, wherein the controller is further configured to ramp up the power output of the power generator.

16. The wind turbine according to claim 15, wherein the controller is further configured to ramp up the power output of the power generator by moving the pitch angle of the at least one blade away from the feathered position.

17. The wind turbine according to claim 14, wherein the controller is further configured to:
   determine whether it is possible to re-connect the turbine to the power grid after the pitch angle of the at least one blade has reached the predefined position; and
   if it is not possible to re-connect to the power grid:
      determine whether a timeout period has been exceeded; and
      repeat the step of determining whether it is possible to re-connect the turbine to the power grid if the timeout period has not been exceeded, and shut down the turbine if the timeout period has been exceeded.

18. The wind turbine according to claim 17, wherein the duration of the timeout period is predefined based on at least one of a component rating of the wind turbine and a grid code requirement.

19. The wind turbine according to claim 17, wherein the controller is further configured to determine whether it is possible to re-connect the turbine to the power grid by determining whether the overvoltage event is over.

20. The wind turbine according to claim 14, wherein the controller is further configured to open at least one of the first circuit breaker and the second circuit breaker by inducing a short circuit condition at one or more of the circuit breakers.

* * * * *